Dec. 24, 1963    H. M. VALENTINE ET AL    3,115,161
BRAKE SYSTEMS AND CONTROL VALVE THEREFOR
Filed May 9, 1961    2 Sheets-Sheet 1

INVENTORS
Harry M. Valentine,
George E. Terment and
Frank R. Schubert
BY Scrivener & Parker
ATTORNEYS Dec. 24, 1963   H. M. VALENTINE ET AL   3,115,161
BRAKE SYSTEMS AND CONTROL VALVE THEREFOR
Filed May 9, 1961   2 Sheets-Sheet 2

INVENTORS
Harry M. Valentine,
George E. Ternent and
Frank R. Schubert
BY Scrivener & Parker
ATTORNEYS United States Patent Office 3,115,161
Patented Dec. 24, 1963

3,115,161
BRAKE SYSTEMS AND CONTROL VALVE THEREFOR
Harry M. Valentine, George E. Ternent, and Frank R. Schubert, Elyria, Ohio, assignors to Bendix-Westinghouse Automotive Air Brake Company, Elyria, Ohio, a corporation of Delaware
Filed May 9, 1961, Ser. No. 108,882
9 Claims. (Cl. 137—625.27)

This invention relates to compressed air operated brake systems for vehicles and more particularly to systems including one or more spring actuators for applying the brakes through the action of a spring under certain conditions.

One of the principal objects of the present invention is to provide a safety brake construction for vehicles equipped with a conventional compressed air braking system, which is so constituted as to automatically and mechanically apply the brakes in the event that the system pressure drops below a predetermined value.

A further object is to provide a novel safety brake construction wherein the vehicle operator must be in the cab of the vehicle in order to operate certain valve devices for the purpose of releasing the brakes of a parked vehicle.

Another object is to provide in an arrangement of the above character a novel construction wherein springs are employed for automatically applying the brakes when the system pressure drops below a predetermined pressure and wherein the springs may be released through operator-controlled devices when the system pressure is increased to a predetermined pressure sufficiently high to permit the vehicle to safely proceed under the control of the compressed air braking system.

Still another object includes the incorporation of the safety spring actuators in a compressed air braking system in a novel manner so as to permit relatively simple installation in conventional air brake systems in order to retain all of the desirable operating characteristics of such systems.

A still further object is to arrange the safety spring actuators in the system in such a manner as to avoid the possibility of simultaneously applying the brakes by the spring actuators and by the conventional service brake chambers, which would otherwise subject the brake operating arms and linkages to excessive brake-applying forces.

A still further object is to provide a novel control valve construction for a system of the above type, which is automatically operable to allow the safety spring brake actuators to apply the brakes when the system pressure drops to a predetermined value, such valve being manually operable at any time in order to apply the spring brakes for parking or for emergency operation.

Another object includes the provision of a novel valve of the above type which comprises relatively few parts and which may be readily connected in existing types of conventional air brake systems.

The above and further objects of the invention will appear more fully hereinafter from a consideration of the following detailed description when taken in connection with the accompanying drawings which disclose one form of the invention. It will be expressly understood, however, that the drawings are employed for purposes of illustration only and are not to be taken as a definition of the limits of the invention, reference being had for this purpose to the appended claims.

Referring to the drawings wherein similar reference characters refer to similar parts throughout the several views.

Figure 1:
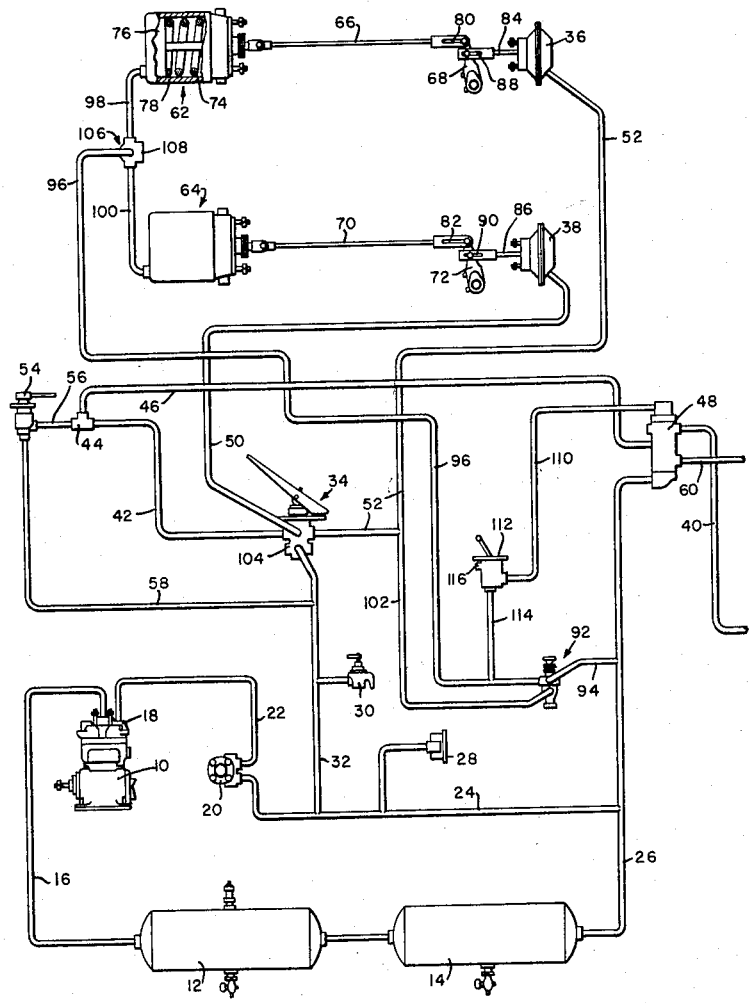
FIG. 1 is a diagrammatic view of a safety brake system embodying the features of the present invention.

The novel safety brake system of the present invention is illustrated in FIG. 1 in connection with a conventional type of air brake system for use on tractor vehicles. More particularly, the system includes a compressor 10, for supplying compressed air to series-connected reservoirs 12 and 14 through a conduit 16, the compressor having the usual unloader 18 controlled by a conventional governor 20 through conduits 22 and 24 connected with an outlet or tractor emergency conduit 26. A suitable pressure gage 28 is connected with the conduit 24 and a conventional low pressure indicator 30 is connected with a conduit 32 inter-connecting conduit 24 with a manually operable self-lapping brake valve 34 which may be of any suitable type. Brake valve 34 may be provided with three outlet conduits for applying the service brake chambers 36 and 38 on the tractor and for charging the trailer service conduit 40 to apply the trailer brakes in service. As shown, conduit 42 is connected with conduit 40 through a double check valve 44 of conventional construction, a conduit 46 and a tractor protection valve 48 which may be constructed as shown in the patent to Earl T. Andrews No. 2,850,330 dated September 2, 1958. It will be understood by those skilled in the art that valve 48 is for the purpose of conserving in the tractor brake system a predetermined air pressure in the event of leakage in the trailer brake system or a break-in-two of the connected vehicles. Outlet conduit 50 is connected with the brake chamber 38 while outlet conduit 52 is connected with brake chamber 36, it being obvious that due to the connections just described, application of the brake valve 34 will simultaneously charge the conduits 42, 50 and 52 to apply the trailer and tractor brakes in service. If desired, a hand operated brake valve 54 of conventional construction may be connected to the double check valve 44 and the conduit 32 by means of conduits 56 and 58, such valve enabling the operator to charge the conduits 46 and 40 to apply the brakes on the trailer at any time that such valve is moved to a position to connect conduits 56 and 58. Normally the valve 54 occupies a position where communication between conduits 56 and 58 is interrupted. Tractor emergency conduit 26 is connected with trailer emergency conduit 60 through the tractor protection 48.

The novel safety brake actuators and control valve of the present invention are inter-connected and associated with the above-described conventional vehicle air brake system in order to provide a relatively simple but highly efficient combined spring operated and compressed air controlled brake system. As shown, the invention includes a pair of spring actuators 62 and 64 of similar construction, actuator 62 being connected through a piston rod 66 with the brake applying arm or slack adjuster 68 while the actuator 64 is connected through a piston rod 70 with the brake applying arm or slack adjuster 72. Actuators 62 and 64 include a chamber or cylinder 74 in which a piston 76 is slidably mounted, the latter being rigidly connected with the piston rod 66. A spring 78 constantly tends to move the piston 76 toward the left, as viewed in FIG. 1, to apply the brake through the rod 66, and does apply the brake when the air pressure in the brake system drops to a predetermined pressure as for example, 40 p.s.i. As illustrated in FIG. 1, the spring actuators 62 and 64 are illustrated in applied position and it is assumed that no pressure is present in the system. Under these conditions, piston rods 66 and 68 are moved toward the left to apply the brakes through the pin and slot connections 80 and 82. It will be understood that during such brake applying movement of the arms 68 and 72, no movement of brake rods 84 and 86 respectively associated with brake chambers 36 and 38 will occur, due to pin and slot connections 88 and 90. With the above arrangement, it will be understood that whenever the actuators 62 and 64 occupy the position illustrated in FIG. 1, the tractor brakes are applied by spring action.

Novel means are employed by the present invention in order to control the spring actuators 62 and 64. As shown, such means includes a two-position control valve 92, to be described hereinafter in detail, which in one position is adapted to conduct reservoir pressure from the conduit 26 to the spring actuators 62 and 64 to the left of the pistons 76 therein by way of supply conduit 94 and conduits 96, 98 and 100. Under these conditions, as soon as the pressure admitted to actuators 62 and 64 reaches a predetermined pressure, as for example about 40 p.s.i., pistons 76 will be moved to compress the springs 78 and release the brakes.

In the other position of the control valve 92, the supply conduit 94 is shut off and the conduit 96 is connected to a conduit 102 which is connected with the outlet conduit 52. Assuming that brake valve 34 is in released position, all outlet conduits 42, 50 and 52 are connected with the atmosphere through the usual exhaust connection 104. Hence, under these conditions, conduits 96, 98 and 100 will also be exhausted to atmosphere to permit application of the brakes by means of the spring actuators 62 and 64. While conduits 98 and 100 may be directly connected with the conduit 96 if desired, it is preferable that they be connected through a quick release valve 106 of well known construction such as for example, as shown in the patent of Earl T. Andrews No. 2,718,897 dated September 27, 1955. Such valves include an exhaust connection 108 which automatically vents the conduits 98 and 100 whenever the pressure in conduit 96 drops to a value slightly lower than that in the conduits 98 and 100. This avoids the necessity of venting the spring actuators 62 and 64 through the brake valve exhaust 104 which would delay the spring brake application.

As will appear more fully hereinafter, valve 92 may be manually moved to the two positions referred to above. Such valve is also constructed as to be automatically movable from the said one to the said other position to automatically permit spring brake actuation whenever the system pressure in supply conduit 94 drops to a predetermined pressure of approximately 40 p.s.i. Thus the invention provides an effective safety system for automatically and mechanically applying the tractor brakes whenever the system pressure drops below a value where it would be unsafe to operate the vehicle and to relay on air braking alone.

The system of FIG. 1 also includes a control line 110 for the tractor protection valve 48 which is connected with the conduit 96 through a trailer two-way control valve 112 and conduit 114. Such valve is of conventional construction and arranged so that in normal position, compressed air may flow from the conduit 96 to the control chamber of valve 48. When the valve is normally moved to emergency position however, such flow is interrupted and the control line 110 is vented to atmosphere via an exhaust port 116 in the valve 112 in order to allow the tractor emergency line 60 to be vented to atmosphere through the valve 48 and thus permit a compressed air emergency brake application on the trailer. Such an emergency trailer application would also occur with the valve 112 in the normal position should the conduit 96 be vented to atmosphere via control valve 92, conduits 102 and 52 and the exhaust 104 of the brake valve 34 as heretofore described. Under such conditions, the tractor brakes would also be automatically applied by the spring brake actuators 62 and 64 as above set forth.

Figures 2, 3, 4:
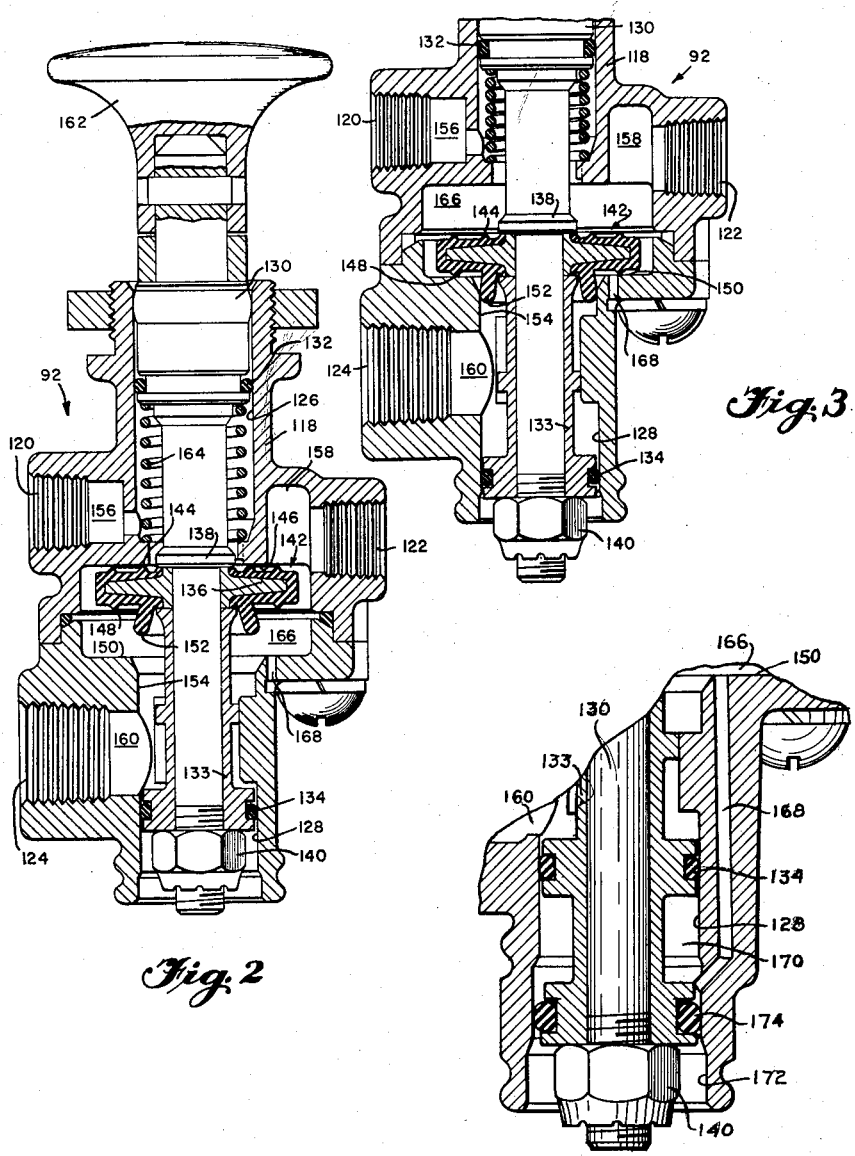
FIG. 2 is an axial sectional view of a control valve for use in the system of FIG. 1, the valve being shown in open or emergency position.
FIG. 3 is a partial view in section of the valve of FIG. 2 shown in closed or released position.
FIG. 4 is a partial view in section of a modified control valve.

Referring more particularly to FIGS. 2 and 3, the novel two-position control valve 92 is illustrated therein as including a casing 118 provided with inlet, outlet and exhaust ports 120, 122 and 124 which are respectively adapted to be connected with conduits 94, 96 and 102. Casing 118 is also provided with axially aligned upper and lower bores 126 and 128 for slideably receiving a valve plunger 130, the latter having an upper portion provided with an O-ring seal 132 received in the upper bore 126 and having also a sleeve 133 fixed to its lower portion and provided with an O-ring seal 134 received in the lower bore 128. A valve supporting member 136 is positioned between the upper end of the sleeve 133 and abuts an annular shoulder 138 on the plunger 130, the parts 136 and 133 being maintained in the position illustrated by means of nut 140 threadedly received by the lower end portion of the plunger 130.

As shown, a valve member 142 of rubbery material is carried by the supporting member 136 and is provided with an upper annular bead 144 which is adapted to contact a seat 146 to form an inlet valve. The lower side of the valve member 142 is formed to provide an exhaust valve and includes an outer annular bead 148 for contacting a seat 150 as well as an inner annular bead or lip 152 which is adapted to sealingly engage a bore 154, see FIG. 3. With the parts shown in the emergency position of FIG. 2, the inlet valve 144 is closed in order to interrupt communication between an inlet chamber 156 and an outlet chamber 158 and connect the latter to an exhaust chamber 160. Under these conditions a spring brake actuation is effected on the tractor since the conduit 96 is connected with the exhaust 104 of the brake valve 34. However, when the parts occupy the position shown in FIG. 3, the exhaust valve 148, 152 is closed and chambers 156 and 158 are interconnected in order to supply reservoir pressure to the spring brake actuators.

While the valve plunger 130 may be manually moved through a suitable handle 162, one of the features of the invention resides in the automatic operation of the valve 92 so that when the reservoir pressure drops to a predetermined value of approximately 40 p.s.i., the valve will automatically move from the normal position shown in FIG. 3 to the emergency position shown in FIG. 2 in order to effect a spring brake actuation. This is achieved by a proper proportioning of the valve elements in combination with a spring 164 which constantly tends to move the plunger 130 upwardly as viewed in FIG. 2. It will be understood that in making a normal service brake application by operation of the brake pedal 34, conduits 52 and 102 will be charged with air pressure and that exhaust chamber 160 of the valve 92 will also be charged. With the valve 92 in the normal position of FIG. 3 such pressure acts upwardly against the lip 152 and acts downwardly against the ring 134 and since the bores 128 and 154 are of the same diameter, there will be no tendency for the braking pressure to move the valve 92 to the position shown in FIG. 2 which would otherwise cause an undesired automatic spring brake actuation. The area of the exhaust valve bead 148, however, is considerably larger than the diameter of the bore 154 so that air pressure above the valve 142 holds the latter on its seat 150 against the action of the spring 164. When the pressure above the valve 142 drops to a value of approximately 40 p.s.i., spring 164 will promptly move the valve to the exhaust or emergency position of FIG. 2 to cause an emergency spring actuation of the brakes as heretofore described. It will also be understood from the above that should the valve 92 be manually moved from the emergency position on FIG. 2 to the normal position of FIG. 3 the valve will promptly move back to its emergency position through the action of the spring 164 unless the pressure in the chamber 156 and hence above the valve 142 is above the approximate value of 40 p.s.i.

Referring again to the position of the valve 92 in FIG. 2, it is pointed out that once the valve has assumed such position by either automatic operation as above described or by manually pulling the handle 162, it must be manually moved to the position of FIG. 3, regardless of the magnitude of the air pressure in chamber 156. This is due to the proportioning of the areas of the bore 126 containing the ring 132, the spring 164 and the area of the inlet valve 144 which latter is preferably slightly less than that of the bore 126. The area differential between the bore 126 and the inlet valve 144 acted upon by the pressure in chamber 156 plus the effect of the spring 164 will thus always maintain the valve in the emergency position of FIG. 2 irrespective of the magnitude of the pressure in the chamber 156. Thus, once the valve 92 is manually or automatically moved to the emergency position of FIG. 2, it must be manually moved to the position of FIG. 3 and will remain in such latter position only if the pressure in inlet chamber 156 and hence above the valve 142 is above the minimum pressure of approximately 40 p.s.i.

It will be noted from FIGS. 2 and 3 that valve 142 moves within a chamber 166 and that the latter is vented to atmosphere by means of a small bore 168. As seen from FIG. 3, bore 168 is positioned inwardly of the bead 148 so as to exhaust to atmosphere any air pressure which might leak past the lip 152 and which might otherwise build up beneath the valve 142 during normal service brake applications, to a value sufficient to cause movement of the valve to the emergency position of FIG. 2 and thereby cause an undesired emergency spring brake actuation. Bore 168 is sufficiently small as to not prevent the build-up of full reservoir pressure in the spring brake actuators 62 and 64 to compress the springs 74 by way of conduits 26, 24, 32, 52, 102, valve 92 and conduits 96, 98 and 100 when the brake valve 34 is operated and the valve 92 occupies the position shown in FIG. 2.

In operation, it is assumed that in FIG. 1, there is no air pressure in the system and that the spring brake actuators 62 and 64 are in the position shown where the vehicle brakes are applied by the action of the springs 78. Valve 92 is in the emergency or open position of FIG. 2 where the chambers 122 and 124 are connected in order to vent the conduit 96 to the brake valve exhaust 104 by way of conduits 102 and 52. Inlet valve 144 is closed and will remain closed until manually moved, regardless of the build-up of pressure at port 120, as heretofore described.

Under the above conditions, operation of the compressor 10 will charge the reservoirs 12 and 14 as well as conduits 24, 32 and 94 to full reservoir pressure. The operator, who must be in the vehicle cab, may now operate the brake valve 34 which simultaneously charges conduits 50 and 52 as well as conduit 102, conduit 96 through open valve 92, quick release valve 106, conduits 98 and 100 and spring brake actuators 62 and 64. Charging of service brake chambers 36 and 38 through the conduits 52 and 50 will then gradually apply the brakes through the slack adjusters 68 and 72 as the effect of the spring brake actuators 62 and 64 on the slack adjusters is gradually released. Thus, the slack adjusters and brake parts are not simultaneously subjected to the combined action of the spring brake actuators and the service brake chambers which otherwise would result in excessive forces being applied to the brake parts.

As soon as the pressure within the actuators 62 and 64 has built up to a value above approximately 40 p.s.i. to effect a release of the spring brake application, the operator may manually move the valve 92 from the position of FIG. 2 to that of FIG. 3 whereupon full reservoir pressure will be conducted to the actuators 62 and 64 by way of conduits 26 and 94, valve 92, and conduits 96, 98 and 100, and the valve 92 will remain in such position as heretofore described. Valve 92 thus effectively "locks" reservoir pressure in the actuators 62 and 64 in order to maintain them in released position after they have been released by operation of the brake valve.

The vehicle may then be operated in the same manner as any vehicle equipped with a conventional air brake system, it being recalled that charging of the conduit 102 during service brake applications will have no effect on the valve 92 which remains in the position shown in FIG. 3. As heretofore stated, however, the valve 92 may be manually moved to its emergency position of FIG. 2 at any time in order to vent the actuators 62 and 64 and effect a spring brake actuation. It is contemplated that this operation will result in an effective parking brake which is mechanical in nature and hence independent of the system pressure. It will also be recalled that in the event the system pressure drops to a minimum value of approximately 40 p.s.i., the valve 92 will automatically move to the position of FIG. 2 to cause a spring brake operation. In either of the above events, the spring brake actuators may be released by operation of the brake valve 34 as heretofore described, provided the system pressure is above the minimum value of approximately 40 p.s.i. Should the pressure in the system be less than the minimum value, the spring brake actuators will remain in applied position and the operator will be apprised that some leakage exists and repairs must be made. During such low pressure conditions, the value 92 will remain in the position shown in FIG. 2. Even if the operator manually pushes in on the handle 162, the valve 92 will immediately return to the emergency position since a system pressure in excess of the minimum pressure is required to maintain the valve in the position of FIG. 3.

FIG. 4 illustrates a modified form of control valve which is constructed and functions in a manner similar to the control valve 92 of FIGS. 2 and 3 except that the small bore 168 is only connected to the atmosphere when the handle 162 is pushed in and the valve occupies the position of FIG. 3. This is achieved by extending the bore 128, the plunger 130 and the sleeve 133 to provide a chamber 170 with which the bore 168 communicates when the parts occupy the position shown in FIG. 4. In this position, chamber 170 and hence the bore 168 are prevented from communication with an enlarged atmospheric chamber 172 by an O-ring seal 174. However, when the valve is moved to a position similar to that of FIG. 3, the O-ring seal 174 moves into the enlarged atmospheric chamber 172 and thus the bore 168 is connected with the atmosphere in order to exhaust any air pressure which might leak past the lip 152 and which might otherwise build up beneath the valve 142 during normal service brake applications to a value sufficient to cause an undesired emergency spring brake application.

With the parts in the position of FIG. 4, the bore 168 is sealed from the atmosphere, as above stated, so as to prevent any leakage of fluid pressure during release of the spring brake actuators 62 and 64 when the brake valve 34 is operated.

This application is a continuation in part of our application Serial Number 42,811 filed July 14, 1960, for Brake Systems and Control Valve Therefor.

The present invention thus provides in a conventional vehicle air brake system, a novel construction which enables a "fail safe" brake application through mechanical means in the event that the system pressure drops below a safe operating value. An effective parking brake is also secured which is independent of the air pressure in the system. The aforesaid mechanical means is disclosed as a spring brake actuator capable of fluid pressure release and such actuator has been incorporated in the system in such a manner as to be automatically operable to apply and release the brake in a manner requiring no special operations or techniques on the part of the operator.

The two-position control valve is mounted in the vehicle cab so as to be readily operable at any time, and in conjunction with the brake valve, constitutes a novel and efficient control for the spring brake actuators. The valve 142 of the control valve 92 in addition to being manually movable is arranged as to be responsive to reservoir or system pressure in such a manner as to maintain the spring brake actuators in released position so long as the system pressure remains above a predetermined minimum. The control valve 92 is also arranged as to exhaust the control conduit 96 of the spring brake actuators through the brake valve, while the valve and bore areas in the control valve are so arranged that undesired spring brake emergency applications are avoided while permitting service brake pressures to be admitted beneath the valve 142.

While preferred forms of the invention have been shown and described herein with considerable particularity, it will be understood by those skilled in the art that a wide variety of changes may be made therein without departing from the spirit of the invention. Reference will therefore be had to the appended claims for a definition of the limits of the invention.

What is claimed is:

1. A valve for the control of fluid pressure comprising a casing having inlet, outlet and exhaust ports and being provided with spaced-apart axially aligned upper and lower bores, said casing having a chamber positioned between said bores, a valve plunger provided with upper and lower pressure responsive piston members respectively slideably mounted in said bores and having a valve element positioned in said chamber, said element having an inlet valve of less effective cross sectional area than said upper piston member and an outlet valve of greater effective cross sectional area than said lower piston member, fluid pressure at said inlet port constantly acting on said upper piston member, said lower piston member being constantly subjected to fluid pressure at said exhaust port, said outlet valve including a part having substantially the same effective cross sectional area as said lower piston member when said outlet valve is closed so that fluid pressure at said exhaust port will have no tendency to move said valve element to open the outlet valve, and resilient means tending to constantly move the valve plunger to a position to close the inlet valve.

2. The valve of claim 1 wherein said casing is provided with a bleed port positioned between said outlet valve part and said outlet valve when the latter is closed, and means controlled by movement of said plunger in a direction to close said outlet valve to connect said bleed port to atmosphere and controlled by movement of said plunger in a direction to open said outlet valve and close the inlet valve to interrupt the connection between said bleed port and atmosphere.

3. The valve of claim 2 wherein the last named means includes a third piston member carried by the valve plunger and slideably mounted in said lower bore, said lower piston member and said third piston member being spaced apart to provide a closed chamber communicating with said bleed port when the valve plunger is moved to a position to close the inlet valve, said third piston member being movable to connect said closed chamber to atmosphere when the valve plunger is moved to a position to close said outlet valve.

4. The valve of claim 1 wherein said part of the outlet valve is formed as a depending annular resilient bead which enters the lower bore and sealingly engages the wall of the latter when the outlet valve is closed.

5. The valve of claim 1 wherein said casing is provided with a bleed port to atmosphere, said port being positioned between said outlet valve part and said outlet valve when the latter is closed.

6. The valve of claim 1 wherein said inlet and outlet valves are formed as annular beads.

7. The valve of claim 1 wherein said casing is provided with a bleed port positioned between said outlet valve part and said outlet valve when the latter is closed, and means controlled by movement of said plunger to connect said bleed port to atmosphere.

8. A valve for the control of fluid pressure comprising a casing having inlet, outlet and exhaust ports and being provided with spaced-apart axially aligned bores, said casing having a chamber positioned between said bores, a valve plunger provided with spaced-apart axially aligned pressure responsive piston members respectively slideably mounted in said bores and having a valve element positioned in said chamber, said element having an inlet valve of less effective cross sectional area than one of said piston members and an outlet valve of greater effective cross sectional area than the other piston member, means for constantly subjecting said one piston member to fluid pressure at said inlet port, means for constantly subjecting the other piston member to fluid pressure at said exhaust port, said outlet valve including a part having substantially the same effective cross sectional area as said other piston member and subjected to fluid pressure at said exhaust port when said outlet valve is closed so that fluid pressure at said exhaust port acting upon said other piston member and said part will be balanced and will have no tendency to move said valve element to open the outlet valve, and resilient means tending to constantly move the valve plunger to a position to close the inlet valve.

9. A valve for the control of fluid pressure comprising a casing having a pair of spaced-apart axially aligned bores, a chamber positioned between said bores and communicating with both bores, said chamber being provided with opposed inlet and outlet valve seats, a movable valve plunger having spaced-apart pressure responsive piston members respectively slideably mounted in said bores, said plunger also having a valve element positioned in said chamber, said element having opposed inlet and outlet valves for respective cooperation with said inlet and outlet valve seats upon movement of said plunger in opposite directions, said casing having an inlet port, an outlet port and an exhaust port, said inlet port being in constant communication with one of said bores, the exhaust port being in constant communication with the other bore and the outlet port being in constant communication with said chamber, said inlet valve being of less effective cross sectional area than the piston member in said one bore and the outlet valve being of greater effective cross sectional area than the piston member in said other bore, said outlet valve having a part of substantially the same effective cross sectional area as the piston member in said other bore when the outlet valve is closed upon the outlet valve seat so that fluid pressure at said exhaust port acting upon said part and the piston member in said other bore will be balanced and will have no tendency to move the valve plunger and valve element, and a spring constantly tending to urge the valve plunger to a position to close the inlet valve.

References Cited in the file of this patent

UNITED STATES PATENTS

| 1,623,557 | Rybeck | Apr. 5, 1927 |
| 1,921,092 | Newton | Aug. 8, 1933 |
| 2,616,658 | Dombeck | Nov. 4, 1952 |
| 3,016,917 | Hunt | Jan. 16, 1962 |

FOREIGN PATENTS

| 596,936 | Canada | Apr. 26, 1960 |